United States Patent [19]

Grillot

[11] 4,088,272
[45] May 9, 1978

[54] BALE LOADER AND SHREDDER

[75] Inventor: Homer N. Grillot, Naperville, Ill.

[73] Assignee: International Harvester Company, Chicago, Ill.

[21] Appl. No.: 568,354

[22] Filed: Apr. 15, 1975

[51] Int. Cl.² .......................................... B02C 21/02
[52] U.S. Cl. ................................. 241/30; 241/101 A;
241/101.7; 214/1 HH; 214/77 R; 214/147 G;
214/518; 294/88
[58] Field of Search ..................... 214/518, 519, 83.14,
214/147 G, 147 AS, 77 R, 78, 80, DIG. 4, 1
HH; 242/86.5 R; 241/101.7, 186 R, 101 A, 30;
294/88; 239/651, 668; 144/3 D, 326 B

[56] References Cited

U.S. PATENT DOCUMENTS

| | | | |
|---|---|---|---|
| 2,758,729 | 8/1956 | VanDusen | 214/77 R |
| 3,006,489 | 10/1961 | Ealet | 214/147 G |
| 3,035,729 | 5/1962 | Soares et al. | 214/519 |
| 3,036,790 | 5/1962 | Rheinberger, Jr. | 242/86.5 R |
| 3,063,723 | 11/1962 | Toft | 214/519 X |
| 3,129,739 | 4/1964 | Wenger | 241/186 R X |
| 3,356,116 | 12/1967 | Brundell et al. | 144/326 B |
| 3,473,679 | 10/1969 | Weichel | 214/519 X |
| 3,586,078 | 6/1971 | Hamilton et al. | 214/77 R |
| 3,618,647 | 11/1971 | Stuart, Jr. | 144/3 D X |
| 3,796,331 | 3/1974 | Dutton | 214/518 X |
| 3,863,850 | 2/1975 | Freeman | 241/101.7 X |
| 3,873,032 | 3/1975 | Jellis, Jr. | 214/519 X |
| 3,877,595 | 4/1975 | Edelman | 214/147 G X |
| 3,924,765 | 12/1975 | Hostetler | 214/518 |
| 3,941,265 | 3/1976 | Nunnally, Jr. | 214/518 X |
| 3,942,666 | 3/1976 | Pfremmer | 214/78 X |
| 3,979,074 | 9/1976 | White et al. | 214/78 X |

FOREIGN PATENT DOCUMENTS

| | | | |
|---|---|---|---|
| 555,822 | 4/1958 | Canada | 214/83.14 |

OTHER PUBLICATIONS

"Hesston Stak Processor Model 10" Brochure from Hesston Corp. Farm Equipment Division, Copyright 1975.

Primary Examiner—Randolph A. Reese
Attorney, Agent, or Firm—Neal C. Johnson; F. David AuBuchon

[57] ABSTRACT

A machine adapted to be towed behind a tractor for loading, shredding, and feeding a cylindrical bale of hay of substantial size and weight. The machine includes a hopper within which a plurality of power driven shredders is disposed for shredding hay from a bale introduced into the hopper. A bale gripping and lifting apparatus is pivotally mounted for engaging a bale on the ground and raising the bale above the hopper. The gripping portion of the apparatus is released to permit the bale to move against the shredders by gravity for progressive shedding of the bale. An auger conveyor is disposed beneath the shredders for conveying the shredded hay out of the hopper. A discharge conveyor receives the hay from the auger and discharges it to the side of the machine for deposit in a windrow on the ground or into a feed bunk as the machine is moved by the tractor.

8 Claims, 7 Drawing Figures

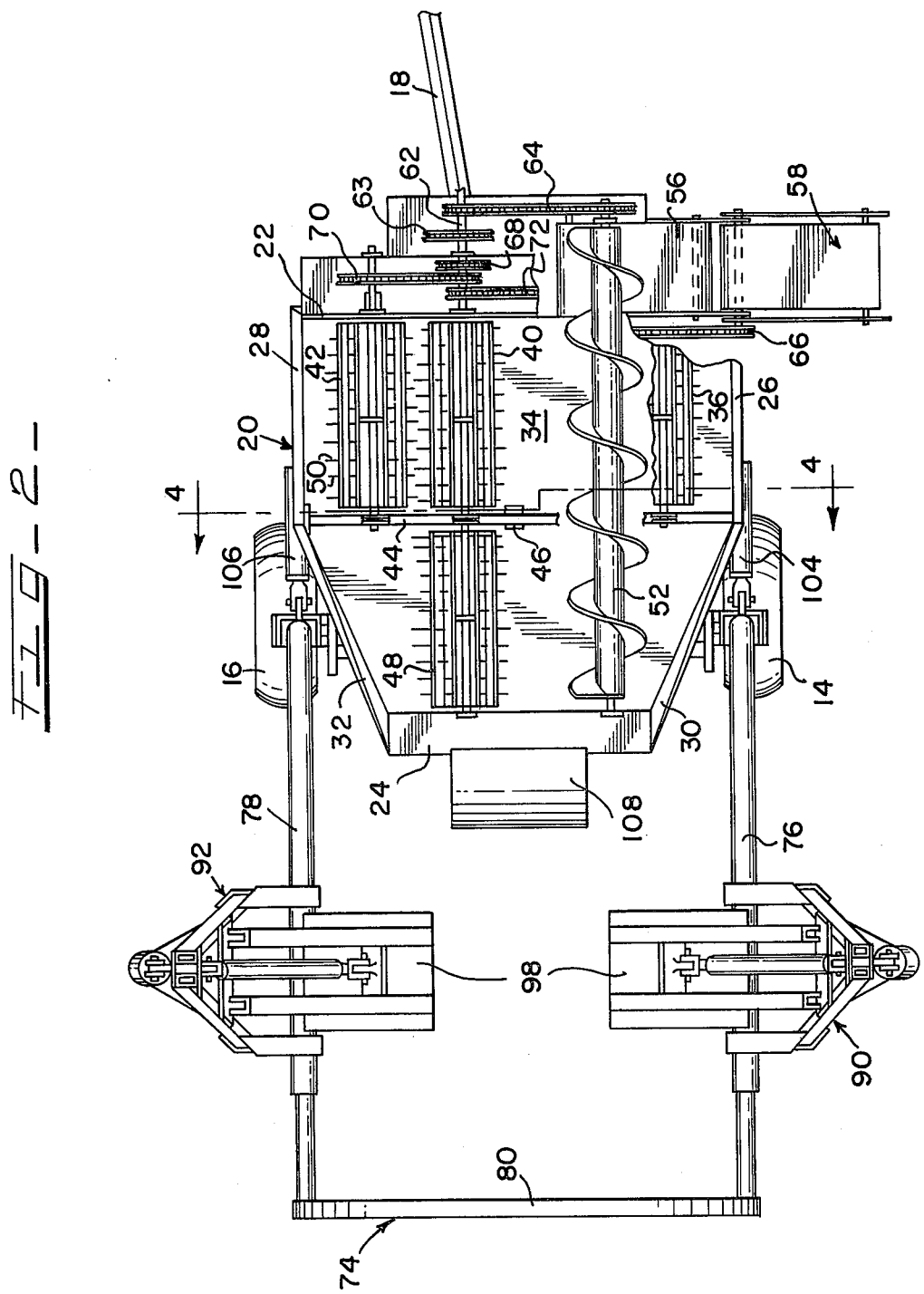

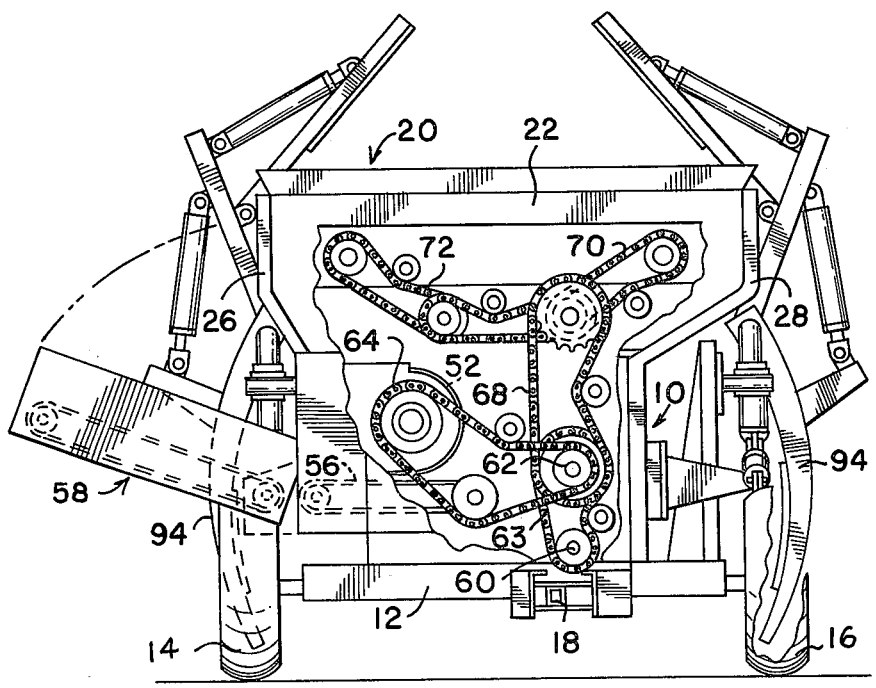
FIG-3-
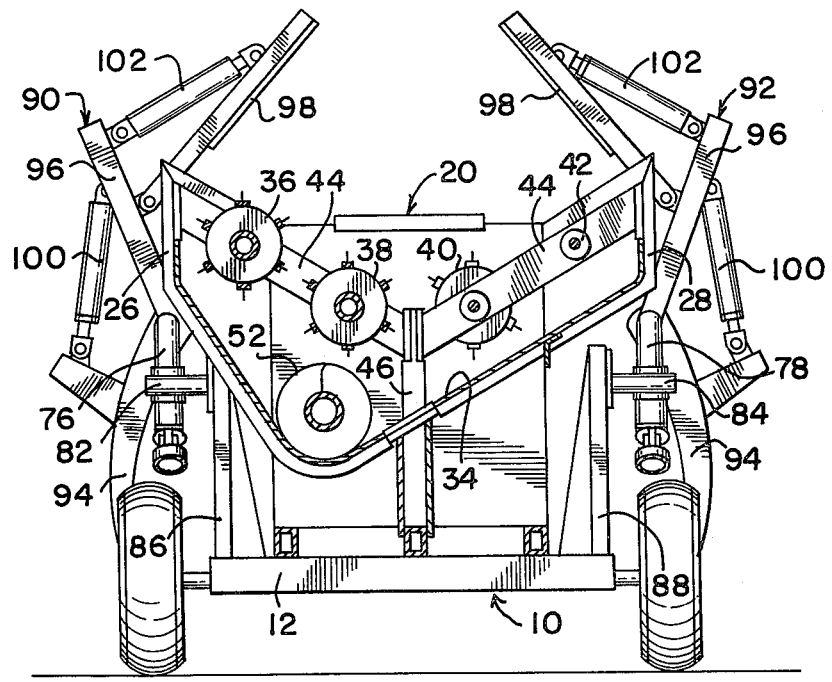
FIG-4-

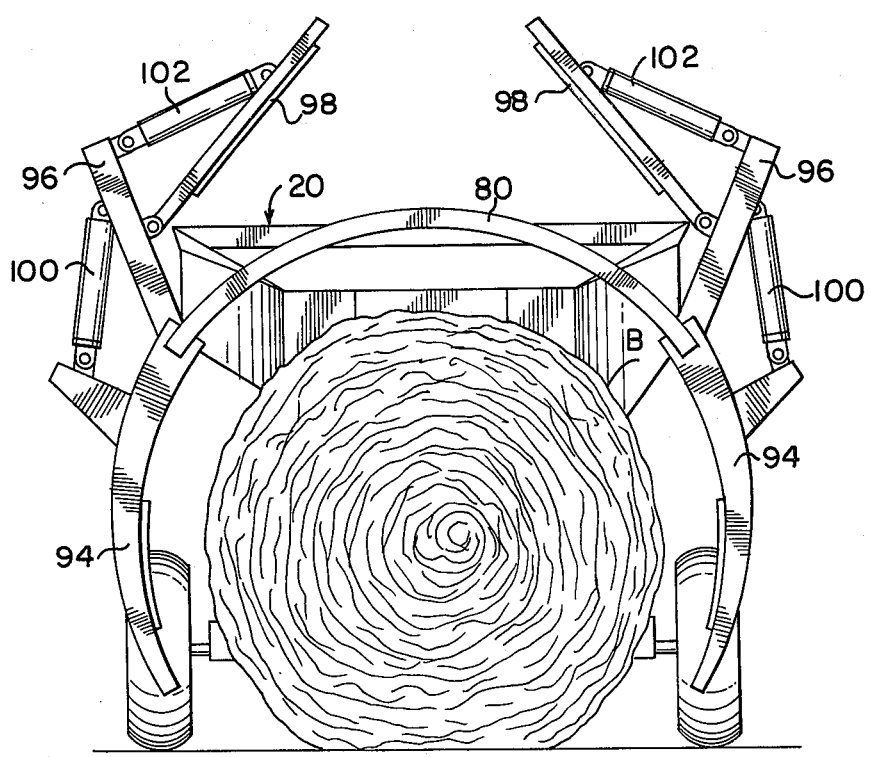
FIG_5_
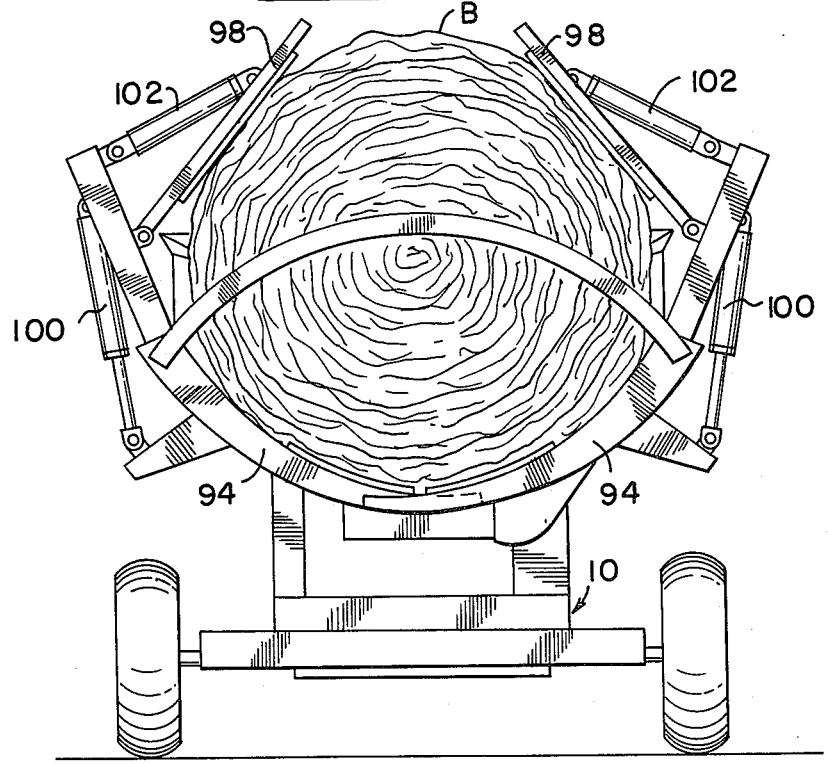
FIG_6_

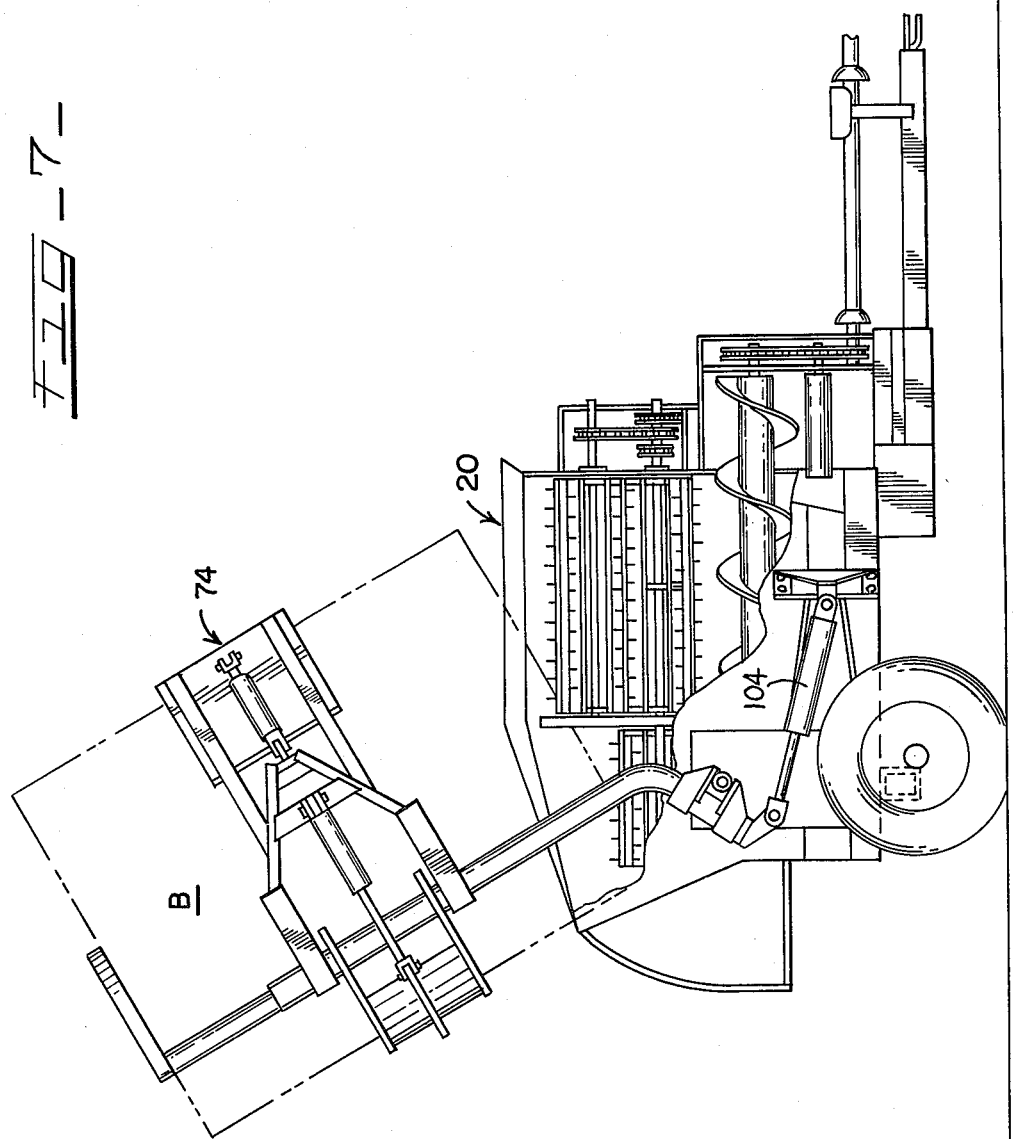

BALE LOADER AND SHREDDER

BACKGROUND OF THE INVENTION

1. Field of the Invention

The invention relates generally to article handling and shredding and more particularly to loading, transporting, shredding and dispensing a bale of hay.

2. Prior Art

The art is replete with machines which shred baled hay and feed the hay into a feed bunk or onto the ground for feeding of livestock. An example is shown in U.S. Pat. No. 3,035,729 wherein a machine similar in principle to the well known "forage wagon" is adapted to handle baled hay. The patent does not disclose how the baled hay is loaded onto the load bed at the outset. Since the disclosed bales are of the conventional so-called "square" type, which are shown neatly stacked in closely adjacent patterns, it is logical to assume that the bales are manually loaded and arranged.

In any case with the advent of large cylinderical bales weighing 1500 lbs. or more, it becomes apparent that a concept is required beyond the disclosure of the subject patent. Typically the cylindrical bales are not compacted to a density as great as the conventional square bales and thus are large and bulky in addition to being heavy. The problems involved in handling such bales, particularly in conjunction with shredding and feeding the same, are not susceptible of ready solution.

Of course, means are presently available for lifting and transporting large cylindrical bales including fork lifts, grapple-like attachments for tractor-mounted loaders, and wheeled carriers such as shown in U.S. Pat. No. 3,861,616. In this patent the additional function of unrolling the cylindrical bale is disclosed, but shredding the hay for feeding is not involved.

SUMMARY

The invention provides a method and apparatus for lifting and transporting a cylindrical bale and shedding material from the bale and discharging the material from the apparatus. In practice the invention provides a wheeled machine adapted to be towed behind and powered by an agricultural-type tractor and includes a lift means for engaging and lifting a bale, shredder means for progressively shredding material from the bale, and conveyor means for feeding the shredded material from the machine as it is moved through the feeding area. The machine is designed to be compact, maneuverable, and rugged for field operation and particularly adaptable to handle bales of 1500 lbs or more and having diameters and widths in the 5' to 6' range or beyond. It is believed that the "gist" of the invention or the inventive concept is in the overall combination rather than in specific details.

It is the primary object of the invention to provide a machine capable of and a method for lifting, transporting, shredding and feeding a bale of hay.

A further object is to handle a bale of hay as set out in the proceeding object even where the bale is of substantial size and weight.

Another object is to provide a machine particularly adapted for feeding shredded hay into elongated feed bunks as the machine is towed therealong.

Still another object is to provide a machine capable of lifting and transporting bales or modules of substantial size and weight.

BRIEF DESCRIPTION OF THE DRAWINGS

FIG. 2 is a plan view of the machine of FIG. 1;

FIG. 3 is an elevation view of the machine with portions thereof broken away to reveal the mechanical drive system of the machine;

FIG. 4 is a sectional view of the machine taken along lines 4—4 of FIG. 2;

FIG. 5 is a rear elevation of the machine in a position to engage a large cylindrical hay bale;

FIG. 6 is a rear elevation similar to FIG. 5 showing the machine in bale lifting position; and FIG. 7 is a side elevation view of the machine showing a bale raised to the shredding position.

DESCRIPTION OF THE PREFERRED EMBODIMENT

Figure 1:
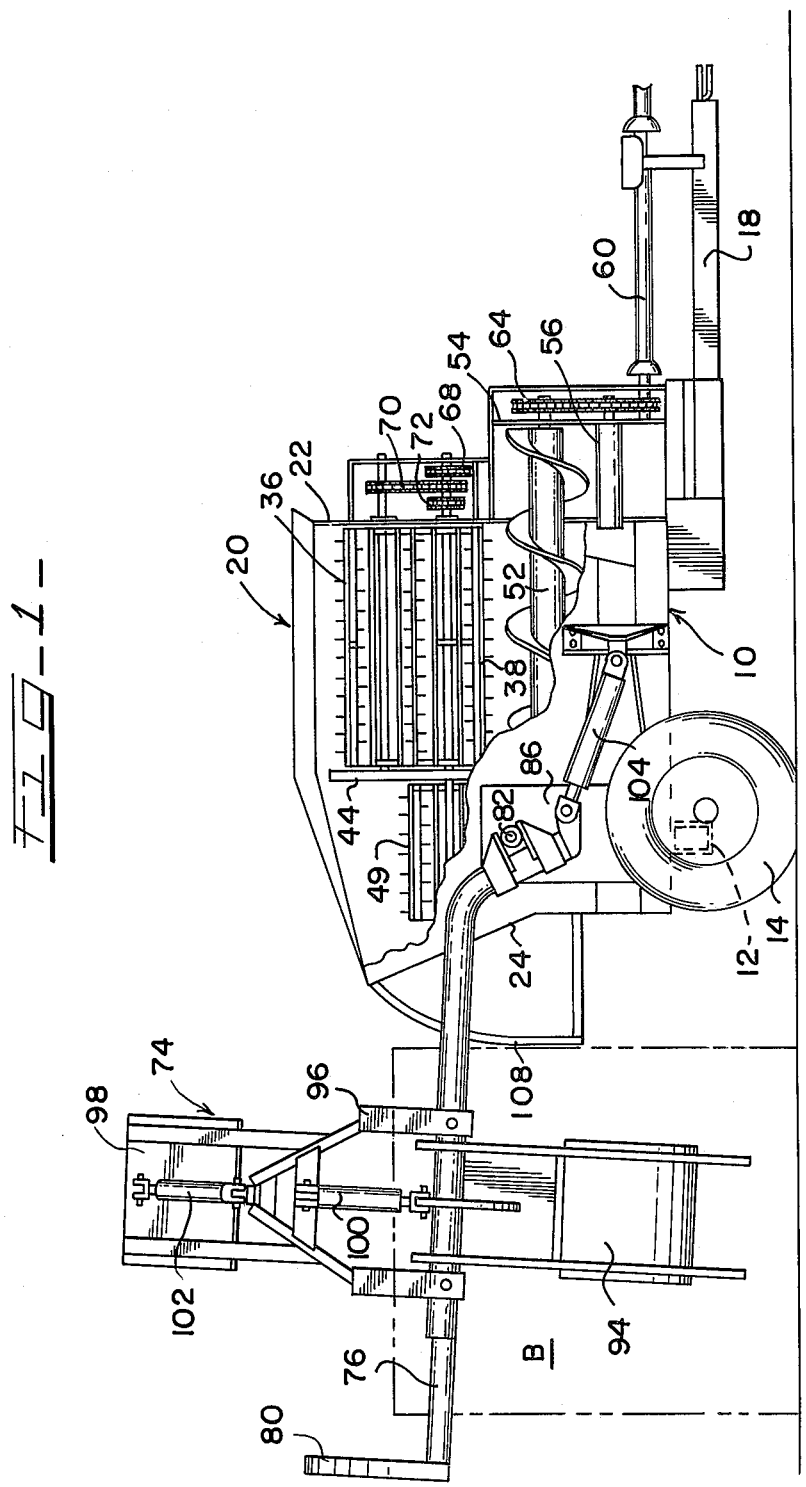
FIG. 1 is a side elevation view of the machine of the invention.

Referring to the drawings there is shown a machine adapted to be towed behind and powered by an agricultural-type tractor. The machine includes a framework 10 having a cross beam 12 to which is connected a pair of wheels 14 and 16. A drawbar 18 is swingably coupled to the framework 10 and projects forwardly for coupling to the tractor. Disposed centrally on the framework 10 is an open-top hopper 20 having a front wall 22, a rear wall 24, and side walls 26 and 28. As shown in FIG. 2 the sidewalls 26 and 28 include sections 30 and 32 which converge rearwardly into connection with the rear wall 24. As best shown in FIG. 4 the hopper 20 includes a troughed bottom wall 34 formed integrally with the above-mentioned front, rear, and side walls to serve as a collector for material processed in the hopper in a manner to be described.

The invention includes means for shredding hay from a bale introduced into the hopper 20. As best shown in FIGS. 2 and 4 a plurality of rotary shredder units are shown at 36, 38, 40 and 42 disposed in parallel relation across the hopper 20 above the bottom wall 34. The shredder units are journalled in the front wall 22 and a V-shaped frame 44 extending between the side walls 26 and 28 and secured to a vertical standard 46 extending upwardly from the basic framework 10 of the machine through the bottom wall 34. The shredder units 38 and 40 include coaxial shredder sections shown at 48 in FIG. 2 and at 49 in FIG. 1 journalled in the frame 44 and the hopper rear wall 24. Each of the rotary shredder units is preferably constructed of a generally cylindrical skeletal structure having a plurality of teeth 50 projecting radially therefrom. Upon rapid rotation of the units the combined effect is an aggressive shredding action on a bale moved thereagainst. The invention contemplates that the shredder units 36 through 42 can be arranged at a variety of positions relative to each other — the requirement being that a shredding zone is established of sufficient area and aggressiveness to effectively shred the bale.

As shown full length in FIG. 2 and partially in FIGS. 1 and 4, an auger conveyor 52 is journalled in the hopper rear wall 24 and a vertical plate 54 (FIG. 1) supported on the framework 10. The auger conveyor 52 is disposed in the trough of the bottom wall 34 and is rotatable to convey the shredded hay forwardly out of the hopper 20 through an opening (not shown) in the front wall 22.

A conveyor 56 of the endless belt type is disposed beneath the forward end of the auger conveyor 52 for receiving the hay therefrom and feeding or discharging the hay transversely from the machine. A conveyor extension 58 of the endless belt type is pivotally mounted on the framework 10 for discharging the hay from the machine — the conveyor 58 being particularly useful in conjunction with discharging material into feed bunks.

Mechanical power drive is transferred to the shredders and conveyors from the towing tractor through conventional PTO drive shafting 60 and drive components shown in FIGS. 1 through 3. Drive is transferred upwardly from the PTO shafting 60 to a jack shaft 62 through a chain and sprocket drive 63. The auger conveyor 52 and the discharge conveyor 56 are driven from the jack shaft 62 by a chain and sprocket drive 64. The extension conveyor 58 is driven from the conveyor 56 through a chain and sprocket drive 66 (FIG. 2). Power drive is transferred upwardly from the jack shaft 62 to the shredder unit 40 through a chain and sprocket drive 68. The shredder unit 42 is driven through a chain and sprocket drive 70 and the other two shredder units 36 and 38 are driven through a chain and sprocket drive 72.

The machine of the invention includes a bale gripping and lifting apparatus shown overall at 74. The apparatus 74 includes a lifter frame comprising a pair of arms 76 and 78 interconnected by an upwardly arcuate brace 80. This frame is pivotally mounted on the machine at coaxial pivot connections 82 and 84 supported on vertical standards 86 and 88 secured on the cross beam 12 (FIG. 4).

The apparatus 74 includes a pair of opposed bale-gripping assemblies 90 and 92 mounted on the arms 76 and 78, respectively, for gripping a bale therebetween. Each of the gripping assemblies 90 and 92 includes a bale lift finger 94 pivotally mounted on the respective arms 76 and 78. An A-frame structure 96 is fixed to each of the arms 76 and 78 and extends upwardly and somewhat outwardly therefrom as best shown in FIG. 4. A clamp 98 is pivotally mounted on each of the frame structures 96. The fingers 94 and clamps 98 are pivotable between bale-engaging and bale-releasing positions by respective sets of double-acting hydraulic piston-cylinder units 100 and 102 which are extensible and retractable relative to the A-frame structures 96.

The apparatus 74 is pivotable about the coaxial connections 82 and 84 by means of a pair of hydraulic piston-cylinder units 104 and 106 on opposite sides of the machine connected between the framework 10 and the respective arms 76 and 78. The units 104 and 106 (as well as the units 100 and 102) are supplied with hydraulic pressure fluid from the hydraulic power system of the towing tractor. Extension and retraction of the units 104 and 106 moves the lift apparatus 74 between the lowered and raised positions of FIGS. 1 and 7.

As best shown in FIGS. 1 and 2 a bale guide plate 108 is secured to the hopper 20 and defines a generally arcuate configuration about the pivot axes of connections 82 and 84 and terminates at its upper end at the top of the hopper rear wall 24. The plate 108 provides an abutment guide surface for a bale being raised by the lift apparatus 74.

The operation of the invention is a relatively simple procedure. The machine is backed toward a cylindrical bale B until the bale is bracketed by the arms 76 and 78 with the longitudinal axis of the bale generally parallel to the arms and with the end of the bale against the guide plate 108. The hydraulic units 100 and 102 are then extended to move the fingers 94 and clamps 98 into firm engagement with the bale. It will be seen with reference to FIG. 5 that the fingers 94 will engage the ball beneath its center while the clamps 98 engage the bale above the center thereby providing circumferentially spaced gripping forces insuring positive and safe lifting.

The hydraulic units 104 and 106 are then extended sufficiently to raise the bale from the ground and the machine is towed to the feeding area. The lift apparatus 74 is then completely raised and the hydraulic system of the tractor is operated so as to gradually or intermittently release the grip on the raised bale to permit it to move downwardly by gravity into the hopper 20. The shredder units 36 through 42 are actuated and hay is shredded from the lower end of the bale as it moves downwardly. Of course, the hydraulic controls will permit the operator to control the rate of movement as determined by the capacity of the shredders. The shredded hay falls onto the hopper bottom wall 34 and is conveyed forwardly out of the hopper 20 by the auger conveyor 52. The hay is received on the cross conveyor 56 and conveyed onto the extension conveyor 58 which discharges the hay from the machine.

What is claimed is:

1. A machine for lifting a bale of hay from the ground, shredding the bale, and feeding the shredded hay therefrom, comprising:
    a mobile frame;
    an open-top hopper on said frame;
    a plurality of power-driven shredders in said hopper adapted to progressively shred hay from a bale introduced into said hopper;
    a bale-gripping and lifting apparatus on said frame for lifting a bale to a position above said hopper, said apparatus including means for selectively reducing gripping force on the bale to permit the bale to move by gravity into said hopper against said shredders for shredding;
    first conveyor means communicating with said hopper beneath said shredders for receiving shredded hay therefrom and conveying the hay out of said hopper; and
    second conveyor means disposed to receive the shredded hay from said first conveyor means and dispense the hay from the machine.

2. The subject matter of claim 1, wherein said bale-gripping and lifting apparatus comprises a framework pivotally mounted on said frame, a pair of bale gripping assemblies mounted on said framework in spaced opposed relation to grip a bale therebetween, each of said assemblies including a pair of bale-gripping members spaced apart to engage the bale at spaced points thereby providing a secure grip for lifting the bale.

3. The subject matter of claim 1, including means mounting said apparatus on said frame for pivoting movement about a horizontal axis, and further including a bale-guide plate defined arcuately about said axis and terminating at said hopper to provide an abutment guide path for a bale being lifting to a position above said hopper.

4. An apparatus adapted for mounting on a mobile carrier for gripping and lifting a cylindrical bale from a position wherein the longitudinal axis of the bale is disposed horizontally, comprising:
    a lifter frame pivotally mounted on said carrier for pivotal movement about a horizontal pivot axis, said frame including a pair of parallel arm portions being swingable about said pivot axis to a position parallel with and bracketing said longitudinal axis of the bale;

a pair of bale-gripping assemblies one on each of said arm portions for gripping the bale therebetween, each of said gripping assemblies including a bale lift element pivotally mounted on said arm portion for engaging the bale below its longitudinal axis, each of said assemblies further including a clamp supported from said arm portion for engaging the bale above its longitudinal axis; and means operative to pivot said lifter frame upwardly about said pivot axis to lift the bale held between said gripping assemblies.

5. The subject matter of claim 4, and further including a bale guide plate on said carrier curved generally arcuately about said pivot axis to provide a guiding surface for a bale being lifted by said lifter frame.

6. A machine for loading, shredding, and feeding a bale of hay, comprising:

a wheeled frame adapted for towing behind a tractor;
an open-top hopper on said frame;
a plurality of power-driven shredders in said hopper adapted to progressively shred hay from a bale introduced into said hopper,
a bale-gripping and lifting apparatus pivotally supported on said frame for lifting a bale from a position on the ground rearward of said hopper to a position above said hopper, said apparatus including means for selectively reducing gripping force on the bale when above said hopper to permit the bale to move by gravity into said hopper for shredding;
a first conveyor disposed beneath said shredders for conveying shredded hay forwardly out of said hopper; and
a discharge conveyor disposed to receive hay from said first conveyor and discharge the hay beyond a side of the wheeled frame.

7. The subject matter of claim 6, wherein said gripping and lifting apparatus comprises a framework pivotally mounted for bale-lifting movement about a transverse horizontal axis, said apparatus further comprises bale-gripping elements mounted on said framework for pivotal actuation about axes disposed at right angles to said horizontal axis.

8. A method of handling and feeding a hay bale, comprising:

gripping a bale having a longitudinal axis disposed parallel to the ground;
raising the bale from the ground about a pivot axis disposed at right angles to the longitudinal axis of the bale to a position above a hopper containing shredding means;
selectively releasing the grip on the bale to permit the bale to move downwardly by gravity into said shredding means;
shredding the bottom of the bale as the bale moves downwardly; and
conveying the shredded hay to a point of discharge.

* * * * *